US012153232B2

(12) United States Patent
Du et al.

(10) Patent No.: US 12,153,232 B2
(45) Date of Patent: Nov. 26, 2024

(54) PRISM APPARATUS AND PROJECTION DEVICE

(71) Applicant: APPOTRONICS CORPORATION LIMITED, Guangdong (CN)

(72) Inventors: Peng Du, Guangdong (CN); Chunlong Cai, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 273 days.

(21) Appl. No.: 17/844,584

(22) Filed: Jun. 20, 2022

(65) Prior Publication Data

US 2022/0317345 A1 Oct. 6, 2022

Related U.S. Application Data

(63) Continuation of application No. PCT/CN2020/137083, filed on Dec. 17, 2020.

(30) Foreign Application Priority Data

Dec. 23, 2019 (CN) .......................... 201911345175.5

(51) Int. Cl.
*G02B 5/04* (2006.01)
*G02B 27/10* (2006.01)
*H04N 9/31* (2006.01)

(52) U.S. Cl.
CPC ........... *G02B 5/04* (2013.01); *G02B 27/1046* (2013.01); *H04N 9/3105* (2013.01)

(58) Field of Classification Search
CPC .... H04N 9/315; H04N 9/3105; H04N 9/3111; H04N 9/3138; H04N 9/3141;
(Continued)

(56) References Cited

U.S. PATENT DOCUMENTS

| 10,230,928 B2 * | 3/2019 | Lyubarsky | ........... G02B 27/283 |
| 2005/0057729 A1 * | 3/2005 | Huang | ................. G03B 21/005 353/33 |

(Continued)

FOREIGN PATENT DOCUMENTS

| CN | 1575436 A | 2/2005 |
| CN | 101063795 A | 10/2007 |

(Continued)

OTHER PUBLICATIONS

International Search Report dated Mar. 5, 2021 for corresponding PCT Application No. PCT/CN2020/137083.
(Continued)

*Primary Examiner* — Sultan Chowdhury
(74) *Attorney, Agent, or Firm* — Tarolli, Sundheim, Covell & Tummino LLP (57) ABSTRACT

A prism apparatus and a projection device are provided. The prism apparatus includes a prism body, a first combining assembly, and a second combining assembly. The prism body includes prisms connected in sequence in a light guiding direction, and a gap is formed at a position where at least two adjacent ones of the prisms are connected to each other. The first combining assembly is arranged parallel to the light guiding direction, located at seams of the prisms, and connected to the prisms. The second combining assembly is arranged parallel to the light guiding direction, and covers and is connected to the first combining assembly.

20 Claims, 5 Drawing Sheets

(58) Field of Classification Search
CPC .. H04N 9/3144; G03B 21/005; G03B 21/006;
G03B 21/008; G03B 21/14; G03B 21/16;
G03B 21/20; G03B 21/28; G02B 27/18;
G02B 27/126; G02B 27/1006; G02B
27/1046; G02B 5/00; G02B 5/04; G02B
5/045
See application file for complete search history.

(56) References Cited

U.S. PATENT DOCUMENTS

| | | | |
|---|---|---|---|
| 2016/0306180 A1* | 10/2016 | Rosa | G03B 33/04 |
| 2017/0139311 A1* | 5/2017 | Nagase | G02B 27/141 |
| 2018/0239230 A1* | 8/2018 | Pettitt | H04N 9/3105 |
| 2018/0259839 A1* | 9/2018 | Okuda | G02B 27/0972 |
| 2019/0129287 A1* | 5/2019 | Yamagishi | G03B 21/2013 |
| 2019/0196305 A1* | 6/2019 | Imaoka | G02B 26/0833 |

FOREIGN PATENT DOCUMENTS

| | | |
|---|---|---|
| CN | 101206391 A | 6/2008 |
| CN | 108398763 A | 8/2018 |
| CN | 108572502 A | 9/2018 |
| CN | 211348975 U | 8/2020 |
| JP | H10239783 A | 9/1998 |
| JP | 2001318211 A | 11/2001 |
| JP | 2009229730 A | 10/2009 |
| JP | 2016224417 A | 12/2016 |

OTHER PUBLICATIONS

Notice of the First Examination Opinion dated Sep. 12, 2024 for Chinese Patent Application No. 201911345175.5.

* cited by examiner

PRISM APPARATUS AND PROJECTION DEVICE

CROSS-REFERENCE TO RELATED APPLICATIONS

This application is a continuation of International Application No. PCT/CN2020/137083, filed on Dec. 17, 2020, which claims priority to Chinese Patent Application No. 201911345175.5, filed on Dec. 23, 2019. The disclosures of the aforementioned applications are hereby incorporated by reference in their entireties.

TECHNICAL FIELD

The present disclosure relates to the technical field of optics and projection, and in particular, to a prism apparatus and a projection device.

BACKGROUND

Projection devices are now commonly used in conferences, home theaters, and other scenarios. With the development of optical instruments, projection devices have been continuously promoted and applied in various industries. As a commonly used optical element in the projection device, the refractive prism is often provided at the light modulator of the opto-mechanical system and is configured to guide the light beam into the light modulator, receives the modulated image light, and guides the image light to the projection lens for projection on the projection screen. The refractive prism in the projection device typically includes multiple prisms. The optical refraction accuracy between the prisms determines the imaging quality of the projection device. As the projection device has wider and wider application, the integration degree of the projection device is gradually improved, which promotes the development of the refractive prism.

However, with the improvement of the accuracy of the projection device, more and more problems of the projection device occur. During projection, bright light is reflected between the prisms, which increases temperature of the prism body. When the prism body is thermally expanded, the gap between the prisms changes, resulting in the aberration that affects the imaging quality. More seriously, high temperature can lead to problems such as failure of the gluing between prisms, changes in the gap and parallelism between prisms due to thermal expansion, heat deformation of the coating surface, and prism cracks. Therefore, it is a problem to improve the stability of prisms at high temperature.

SUMMARY

In order to solve the above technical problem, the present disclosure provides a prism apparatus. The prism apparatus includes a prism body, a first combining assembly, and a second combining assembly. The prism body includes prisms connected in sequence in a light guiding direction, and a gap is formed at a position where at least two adjacent ones of the prisms are connected to each other. The first combining assembly is arranged parallel to the light guiding direction, located at seams of the prisms, and connected to the prisms. The second combining assembly is arranged parallel to the light guiding direction, and covers and is connected to the first combining assembly.

The present disclosure further provides a projection device including a projection display screen, and the projection device includes the prism apparatus described above and a light source. Light emitted from the light source is projected onto the projection display screen through the prism apparatus.

In the prism apparatus and projection device provided by the present disclosure, the prism apparatus is provided with the first combining assembly which is located at the seam of at least two adjacent prisms of the prism body and connected to the prisms, and the first combining assembly prevents a force generated by the second combining assembly after being heated from transferring to the prism body. That is, a tensile force generated by the second combining assembly after being heated is blocked by the first combining assembly and is not directly applied on the prisms of the prism body, which prevents the second combining assembly from affecting the air gap of the prism body after the second combining assembly is expanded due to being heated, thereby improving the stability of the prism body.

BRIEF DESCRIPTION OF DRAWINGS

To describe the technical solutions in the implementations of the present disclosure more clearly, the drawings required to describe the implementations of the present disclosure are briefly described below. Apparently, the drawings described below are only some implementations of the present disclosure. Those of ordinary skill in the art may further obtain other drawings based on these drawings without creative efforts.

DETAILED DESCRIPTION

The technical solutions in the embodiments of the present disclosure are clearly and completely described below with reference to the drawings in the embodiments of the present disclosure. Apparently, the described embodiments are merely some rather than all of the embodiments of the present disclosure. All other embodiments obtained by those of ordinary skill in the art based on the embodiments of present disclosure without creative efforts fall within the protection scope of present disclosure.

It should be noted that in the description of the present disclosure, the terms such as "upper", "lower", "left", "right", "horizontal", "vertical", "inner" and "outer" indicate the orientation or position relationships based on the drawings. These terms are merely intended to facilitate description of the present disclosure and simplify the description, rather than to indicate or imply that the mentioned device or element must have a specific orientation and must be constructed and operated in a specific orientation. Therefore, these terms should not be construed as a limitation to the present disclosure. Moreover, the terms such as "first" and "second" are used only for the purpose of description and cannot be understood as indicating or implying relative importance or implicitly indicating the number of technical features denoted. In the description of the present disclosure, "multiple" means two or more, unless otherwise specifically defined.

In the present disclosure, it should be noted that, unless otherwise clearly specified and limited, the meanings of terms "mounting" and "connection" should be understood in a broad sense. For example, the "connection" may be a fixed connection, a removable connection or an integrated connection, and may be a direct connection or an indirect connection via an intermediate medium. Those of ordinary skill in the art may understand specific meanings of the above terms in the present disclosure based on the specific situation.

It should be understood that, in the description of the embodiments of the present disclosure, the terms "first" and "second" are only for the convenience of describing the present disclosure and simplifying the description, and therefore should not be construed as a limitation to the present disclosure.

The present disclosure provides a prism apparatus. The prism apparatus includes a prism body, a first combining assembly, and a second combining assembly. The prism body includes multiple prisms connected in sequence in a light guiding direction. A gap is formed at a connection of at least two adjacent prisms. The first combining assembly is arranged parallel to the light guiding direction, located at seams of the multiple prisms, and connected to the multiple prisms. The second combining assembly is arranged parallel to the light guiding direction, covers and is connected to the first combining assembly.

In the prism apparatus by the present disclosure, the first combining assembly is located at the seam of at least two adjacent prisms of the prism body and connected to the prisms, and thus the first combining assembly prevents a force generated by the second combining assembly after being heated from transferring to the prism body. That is, a tensile force generated by the second combining assembly after being heated is blocked by the first combining assembly and is not directly applied on the prisms of the prism body, which prevents the second combining assembly from affecting the air gap of the prism body after the second combining assembly is expanded due to being heated, thereby improving the stability of the prism body.

Figure 1:
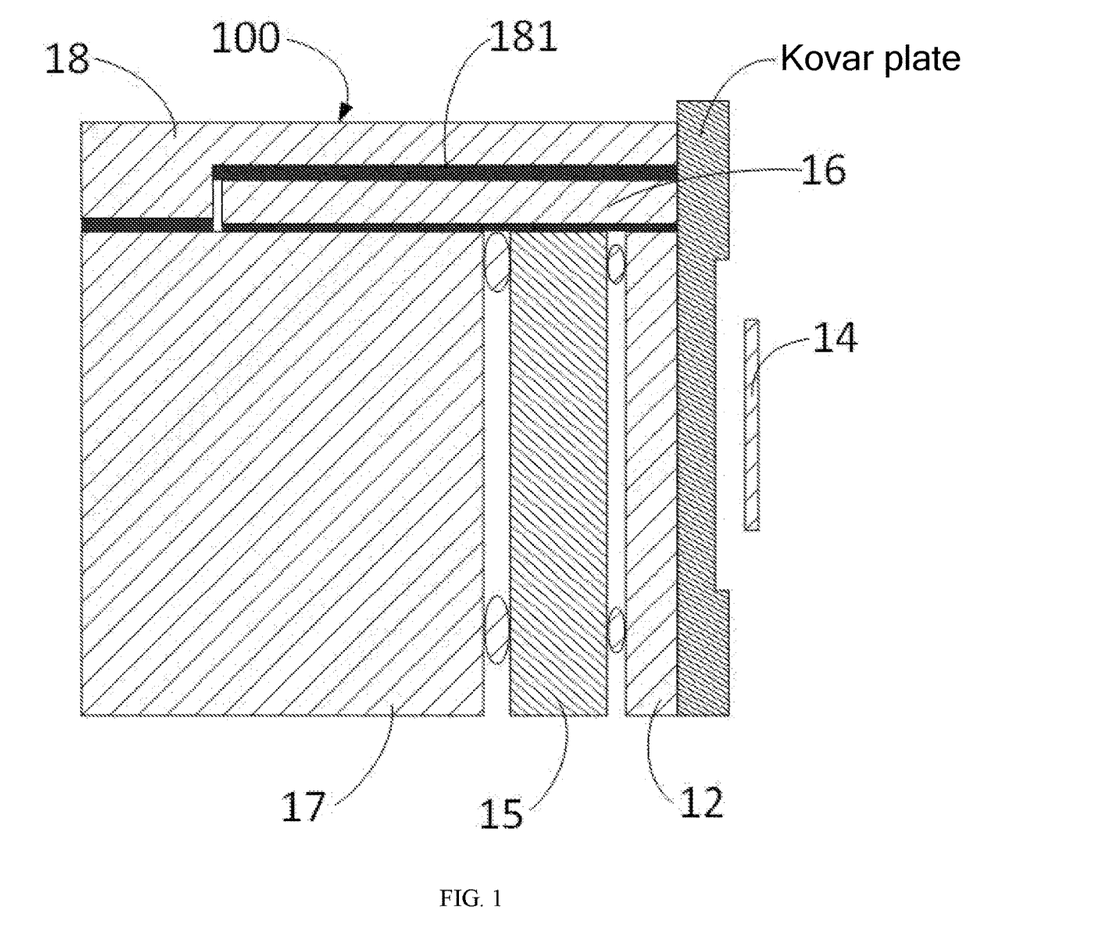
FIG. 1 is a sectional view of a prism apparatus according to a first embodiment of the present disclosure.
Figure 2:
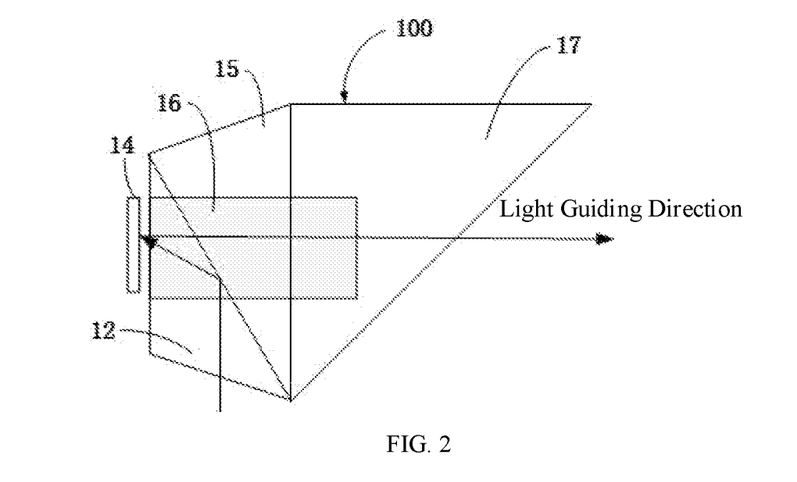
FIG. 2 is a top view of a prism body of the prism apparatus shown in FIG. 1.

Referring to FIG. 1 and FIG. 2, FIG. 1 is a sectional view of a prism apparatus according to a first embodiment of the present disclosure. FIG. 2 is a top view of a prism body of the prism apparatus shown in FIG. 1, and FIG. 2 is a top view of the prism apparatus shown in FIG. 1 after a second combining assembly is removed.

As shown in FIG. 2, in an embodiment, the prism body refers to a whole formed by the prisms. The prisms have high light transmittance. In FIG. 2, the straight line with an arrow denotes a movement route of a light beam. When a light beam irradiates the prism body, due to that the prisms are transparent, most of the incident light beams enter the prism body and are reflected on a contact surface of two prisms based on an incident angle and incident to a light modulator located on an optical path. The light modulator modulates and emits the light beam toward the prism body. In the present disclosure, this direction is used as the light guiding direction of the prism body.

The prism body includes a first prism 12, a second prism 15, and a third prism 17. The first prism 12, the second prism 15, and the third prism 17 are made of materials with a same thermal expansion coefficient and high light transmittance, such as K9 material. The K9 glass is a glass product made of K9 material, and has a thermal expansion coefficient of 7.6 * $10^{-6}$m/K, and a temperature range of −30° C. to 70° C. That is, when the temperature changes in the range of −30° C. to 70° C., a thickness of K9 glass increases by 7.6 μm as the temperature increases every 1° C. In an embodiment, the first prism 12, the second prism 15, and the third prism 17 are triangular prisms with a same height. The triangular prisms include a side surface, an upper surface, and a lower surface. The side surface of the first prism 12 and the side surface of the second prism 15 are bonded to each other, and the side surface of the second prism 15 and the side surface of the third prism 17 are bonded to each other. The upper surface of the first prism 12, the upper surface of the second prism 15, and the upper surface of the third prism 17 are located on a same plane. In an embodiment, a gap is formed between the side surface of the first prism 12 and the side surface of the second prism 15 that are bonded to each other, and a gap is formed between the side surface of the second prism 15 and the side surface of the third prism 17 that are bonded to each other.

In other embodiments, the first prism 12, the second prism 15, and the third prism 17 can be made of other materials with a same thermal expansion coefficient and high light transmittance. The first prism 12, the second prism 15, and the third prism 17 can have other shapes, for example, they can be quadrangular prisms.

As shown in FIG. 2, the first combining assembly 16 is provided parallel to the light guiding direction of the prism body, located at the seams of multiple prisms, and connected to the multiple prisms. The second combining assembly 18 is provided parallel to the light guiding direction, covers and is connected to the first combining assembly.

In an embodiment, the second combining assembly 18 can be configured to fix the relative positions of the prism body and other components of the prism apparatus 100. The second combining assembly 18 is generally located close to the prism body, parallel to the light guiding direction, and covers a surface of the prism body. In an embodiment, the second combining assembly 18 covers an upper surface of the prism body, and the second combining assembly 18 can be configured to conduct heat of the prism body. The second combining assembly 18 can be made of a metal material due to that the metal material has a good thermal conductivity, and is suitable for the prism body to dissipate heat under a high-brightness and a long-time illumination.

In an embodiment, the second combining assembly can be made of metal, and the second combining assembly 18 can be made of SUS430. The second combining assembly 18 can be in a shape of a long plate.

In other embodiments, the second combining assembly 18 can be provided on a lower surface of the prism body and is configured to fix and support the prism body.

In an embodiment, if the second combining assembly 18 is made of metal, due to that the thermal expansion coefficient of the second combining assembly 18 is 10.4 *$10^{-6}$m/K, when the second combining assembly 18 is heated, a length of the second combining assembly 18 increases by 10.4 μm as the temperature increases every 1° C. That is, the amount of change in the length of the metal plate is larger than the amount of change in the thickness of the prism body by 2.8 μm as the temperature increases every 1° C. Therefore, the metal plate will exert a lateral tensile force on the prism body. In order to prevent the lateral tensile force from being directly applied on the prism body, the first combining assembly is provided between the prism body and the second combining assembly 18.

The first combining assembly 16 is provided between the prism body and the second combining assembly 18 and parallel to the light guiding direction. The first combining assembly 16 is configured to prevent the force transferring between the second combining assembly 18 and the prism body. For example, the first combining assembly 16 is provided on the upper surface of the prism body. The first combining assembly 16 covers the upper surface of the first prism 12, the upper surface of the second prism 15, and the upper surface of the third prism 17. That is, the first combining assembly 16 covers the upper surface of the first prism 12, the upper surface of the second prism 15, and the upper surface of the third prism 17, and also covers the seams between the upper surfaces of these prisms.

In other embodiments, the first combining assembly 16 can completely cover an entire upper surface of the prism body. For example, the first combining assembly 16 can completely cover the upper surface of the first prism 12, the upper surface of the second prism 15, and the upper surface of the third prism 17.

In other embodiments, there are multiple first combining assemblies 16, which are respectively provided at a seam between the upper surface of the first prism 12 and the upper surface of the second prism 15 and a seam between the upper surface of the second prism 15 and the upper surface of the third prism 17.

In other embodiments, the first combining assembly 16 and the second combining assembly 18 can be provided on the lower surface of the prism body, or provided on the upper surface and the lower surface of the prism body. The first combining assembly 16 and the second combining assembly 18 are provided on the surface of the prism body parallel to the light guiding direction without affecting the normal operation of the prism body.

In this embodiment, in order to ensure that the amount of expansion of the first combining assembly 16 is the same as the amount of expansion of the prism body when the first combining assembly 16 and the prism body are thermally expanded, and to prevent the first combining assembly from generating a lateral tensile force on the prism body, the first combining assembly 16 is made of a same material as the prism body. That is, the material of the first combining assembly 16 can also be made of K9 glass. Since the first combining assembly 16 is provided between the second combining assembly 18 and the prism body, in order to facilitate the surface of the first combining assembly 16 to fit with the prism body and the second combining assembly 18, the first combining assembly 16 is also in the shape of a long plate. That is, the first combining assembly 16 is a glass blocking plate. In order to ensure the stability between the second combining assembly 18 and the first combining assembly 16, the thickness of the first combining assembly 16 should not be too large. In an embodiment, the thickness of the first combining assembly 16 is smaller than the thickness of the second combining assembly 18.

In an embodiment, an accommodating cavity 181 is provided at a surface of the second combining assembly 18 facing towards the prism body and corresponding to the first combining assembly 16. The accommodating cavity 181 is configured to accommodate the first combining assembly 16. The accommodating cavity 181 includes an inner surface and a bottom surface. A shape of a cross section of the accommodating cavity 181 matches a shape of a cross section of the first combining assembly 16, that is, the cross section of the accommodating cavity 181 can be rectangular. An area of the cross section of the accommodating cavity 181 is greater than an area of the cross section of the first combining assembly 16, that is, when the first combining assembly 16 is accommodated in the accommodating cavity 181, a gap is formed between a side surface of the first combining assembly 16 and the corresponding inner surface of the accommodating cavity 181, which ensures a clearance fit between the accommodating cavity 181 and the first combining assembly 16, and prevents the first combining assembly 16 from being restricted by the accommodating cavity 181 when the first combining assembly 16 expands after being heated. Meanwhile, it is also avoided that the second combining assembly 18 damages the first combining assembly 16 during assembly.

A depth of the accommodating cavity 181 is smaller than the thickness of the first combining assembly 16, which ensures that a surface of the first combining assembly 16 facing away from the prism body is in contact with the bottom surface of the accommodating cavity 181 when the first combining assembly 16 is accommodated in the accommodating cavity.

Figure 3:
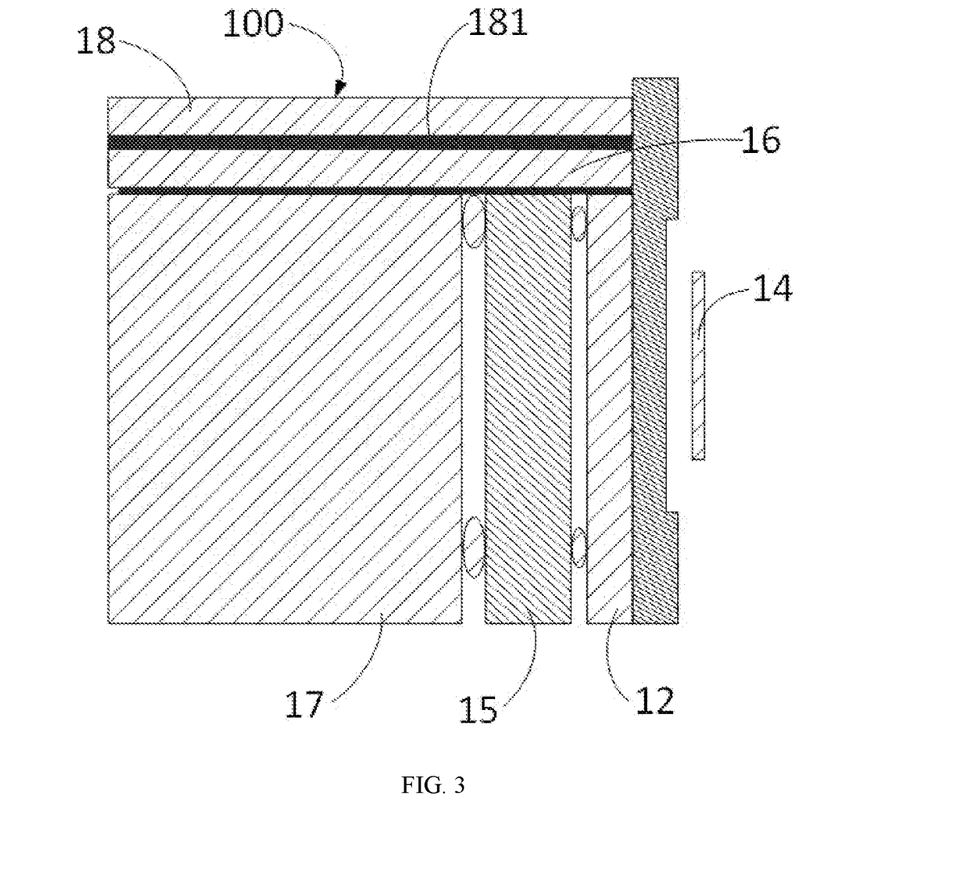
FIG. 3 is a sectional view of a prism apparatus according to a second embodiment of the present disclosure.

Referring to FIG. 3, FIG. 3 is a sectional view of a prism apparatus according to a second embodiment of the present disclosure.

As shown in FIG. 3, the second combining assembly 18 can also be directly connected to the first combining assembly 16, that is, the first combining assembly 16 covers the upper surface of the prism body, the second combining assembly 18 covers the upper surface of the first combining assembly 16, and a stack structure is formed by stacking the prism body, the first combining assembly 16, and the second combining assembly 18 in sequence. The prism body and the first combining assembly 16 are connected to each other by ultraviolet (UV) glue, and the first combining assembly 16 and the second combining assembly 18 are also connected to each other by UV glue, which avoids providing a cavity on the second combining assembly 18, ensures that the overall structure of the second combining assembly 18 is complete, and enhances the fixing effect and heat conduction effect of the second combining assembly 18.

As shown in FIG. 1, in an embodiment, the prism apparatus further includes a light modulator 14 and a diaphragm. The light modulator 14 modulates a certain parameter of a light field through control information under active control. For example, the light modulator 14 modulates the amplitude of the light field, modulates the phase by the refractive index, modulates the polarization state by the rotation of the polarization plane, or implements incoherent-coherent light conversion, so as to write certain information to the light wave to modulate the light wave. The light modulator 14 is an important device in the field of modern optics such as real-time optical information processing, adaptive optics, and optical computing. In an embodiment, the light modulator 14 is provided close to the first prism 12, such that the light reflected by the first prism 12 is incident to a position of the light modulator 14, and the position of the light modulator 14 is determined according to the angle of light reflected by the first prism 12.

The diaphragm is an entity that confines the light beam in the optical system, and can be an edge or a frame of a lens, or a specially provided screen with a hole. The diaphragm has two functions, limiting the light beams or limiting the field of view (i.e. imaging range). In an embodiment, the diaphragm is fixed in a fernico plate, that is, the Kovar plate in FIG. 1. The Kovar plate is fixed between the first prism 12 and the light modulator 14, such that the light beam reflected by the first prism 12 passes through the diaphragm in the Kovar plate and enters the light modulator 14.

During assembly, first, the prism body is assembled. The prisms of the prism body are bonded together by soft glue. Since the thermal expansion coefficient of the glue is large, it will cause damage to the prisms at high temperature, so the UV glue with a thermal expansion coefficient close to the prisms is used. The thermal expansion coefficient of the UV glue is $9.6*10^{-6}$ m/K. The UV glue is dispensed on the side surfaces of the first prism 12 and the second prism 15, and the side surfaces on which the UV glue is dispensed are bonded to each other. After the first prism 12 and the second prism 15 are bonded together, the upper surface of the first prism 12 and the upper surface of the second prism 15 are located on a same plane. A photo-initiator (or photo-sensitizer) a UV curing material of the UV glue generates active free radicals or cations after absorbing UV light under UV irradiation, and initiates monomer polymerization and cross-linking reactions. Thus, the adhesive is converted from a liquid state to a solid state within a few seconds, thereby realizing the bonding of the first prism 12 and the second prism 15. After the positions of the first prism 12 and the second prism 15 are fixed, the relative side surfaces of the second prism 15 and the third prism 17 are bonded to each other with dispensing according to the above method. In this way, the positions of the first prism 12, the second prism 15 and the third prism 17 are relatively fixed, and the upper surfaces of all the prisms are located on a same plane. A gap is formed between the bonding surfaces of the first prism 12 and the second prism 15, and a gap is formed between the bonding surfaces of the second prism 15 and the third prism 17.

In other embodiments, UV glue can also be coated to some regions of the surfaces of the prisms by means of dispensing. For example, the UV glue is dispensed in regions of the side surfaces of the first prism 12 and the second prism 15 close to the corners, and then the side surfaces coated with the UV glue are bonded.

Second, the first combining assembly 16 is assembled with the prism body. The UV glue is applied evenly on the upper surface of the first prism 12, the upper surface of the second prism 15, and the upper surface of the third prism 17. The UV glue is coated at at least the seam between the upper surface of the first prism 12 and the upper surface of the second prism 15 and the seam between the upper surface of the second prism 15 and the upper surface of the third prism 17. Then the first combining assembly 16 covers the coating positions of the UV glue. When the UV glue is converted into a solid state, the positions of the first combining assembly 16 and the prism body are relatively fixed.

Then, the second combining assembly 18, the first combining assembly 16, and the prism body are assembled. The UV glue is evenly coated on the bottom surface of the accommodating cavity of the second combining assembly 18, and the second combining assembly 18 covers the prism body, such that the first combining assembly 16 is correspondingly accommodated in the accommodating cavity of the second combining assembly 18. The surface of the first combining assembly 16 facing away from the prism body is in contact with the bottom surface of the accommodating cavity. After the UV glue in the accommodating cavity is solidified, the positions of the second combining assembly 18 and the first combining assembly 16 are relatively fixed. The depth of the accommodating cavity is smaller than the thickness of the first combining assembly 16, so after the surface of the first combining assembly 16 facing away from the prism body abuts against the bottom surface of the accommodating cavity, a gap is formed between the second combining assembly 18 and the prism body. A thermally conductive adhesive is injected into the gap between the second combining assembly 18 and the prism body. After the thermally conductive adhesive is solidified, the positions of the second combining assembly 18 and the prism body are relatively fixed. The thermally conductive adhesive is configured to conduct heat of the prism body to the second combining assembly.

Finally, the light modulator 14 is assembled. The light modulator 14 is first assembled with the Kovar plate where the diaphragm is located, and then the surface of the first prism 12 and the Kovar plate where the diaphragm is located are fixed by the UV glue. Thus, the assembly process of the prism apparatus 100 is completed.

In this way, the first combining assembly 16 provided between the prism body and the second combining assembly 18 and thus prevents the second combining assembly 18 from exerting the tensile force on the prism body after being heated, which ensures the space between the prisms, and avoids problems such as blush, pixel separation, and Newton's rings in the light beam reflected by the prisms. In this way, the prism apparatus 100 can still remain stable in an environment with cyclic temperature changes.

Figure 4:
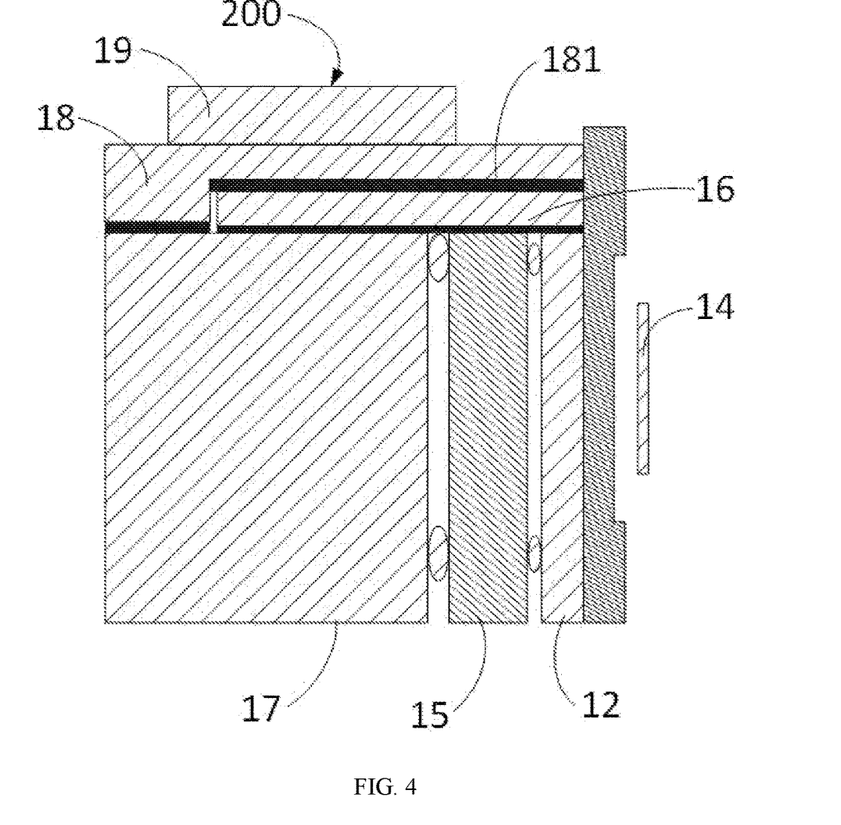
FIG. 4 is a sectional view of a prism apparatus according to a third embodiment of the present disclosure.

Referring to FIG. 4, FIG. 4 is a sectional view of a prism apparatus according to a third embodiment of the present disclosure.

As shown in FIG. 4, the structure of the prism apparatus 200 in an embodiment is similar to the structure of the prism apparatus 100 described in the above-mentioned embodiment, and the main difference therebetween is that the prism apparatus 200 in the embodiment further includes a heat dissipation mechanism 19. The heat dissipation mechanism 19 is provided on a surface of the second combining assembly 18 facing away from the prism body. The heat dissipation mechanism 19 can be a heat dissipation fin provided on the second combining assembly 18. When the temperature of the prism body and the second combining assembly 18 rises, the heat dissipation fin provided on the second combining assembly 18 can expand the heat dissipation area, thereby reducing the effect of temperature on the prism apparatus 100.

In other embodiments, the heat dissipation mechanism 19 can also be a fan. The fan and the second combining assembly 18 are connected by a thermally conductive adhesive. Meanwhile, a temperature sensor is provided in the prism apparatus 100. When the temperature sensor in the prism apparatus 200 senses that the temperature of the second combining assembly 18 reaches a temperature threshold, the fan is activated to dissipate heat from the prism apparatus 200. The temperature threshold is a preset temperature of the prism body, and when the temperature of the prism body reaches this temperature, the fan is powered on.

In other embodiments, the surface of the second combining assembly 18 facing away from the prism body can further be provided with an air duct. An inlet of the air duct is provided on the surface of the second combining assembly 18 or on the surface of the second combining assembly 18 facing away from the prism body, and the air duct is provided along a length direction or a width direction of the second combining assembly 18. The temperature of the prism body is transmitted to the second combining assembly 18 through the thermally conductive adhesive, and the second combining assembly 18 dissipates heat into the atmosphere through the air flowing in the air duct to achieve heat dissipation.

Thus, the second combining assembly 18 is provided with a heat dissipation mechanism 19 to speed up the heat dissipation of the prism body and the second combining assembly 18, to reduce the effect of temperature on the prism body and the amount of thermal expansion of the prism body, to improve the stability of the prism apparatus 200, and to expand the scope of application of the prism apparatus 200.

Figure 5:
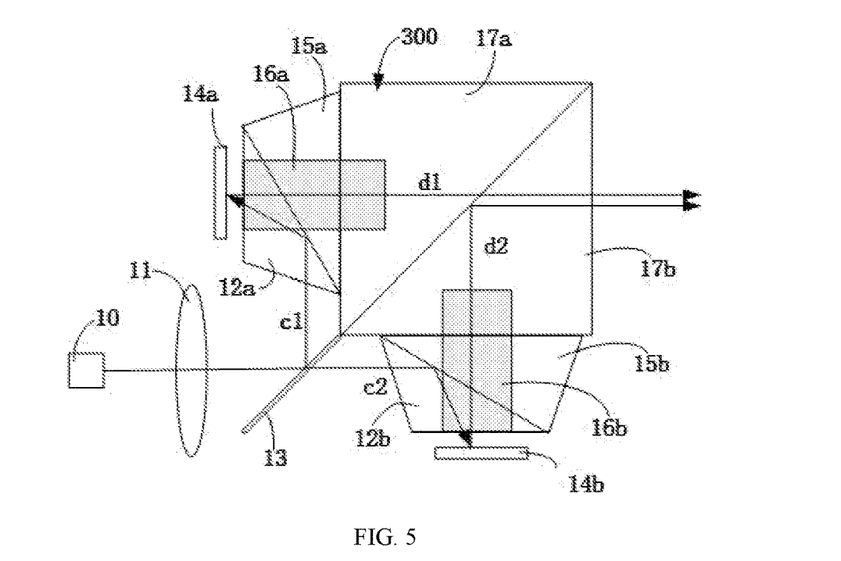
FIG. 5 is a top view of a prism apparatus according to a fourth embodiment of the present disclosure.

Referring to FIG. 5, FIG. 5 is a top view of a prism apparatus according to a fourth embodiment of the present disclosure, and FIG. 5 is a top view of the prism apparatus according to another embodiment of the present disclosure after the second combining assembly is removed.

As shown in FIG. 5, the structure of the prism apparatus 300 in an embodiment is similar to that of the prism apparatus 100 described in the above-mentioned embodiment, and the main difference therebetween is that the prism apparatus 300 in the embodiment includes two prism bodies. For the convenience of distinction, in an embodiment, in addition to a first prism 12*a*, a second prism 15*a*, and a third prism 17*a*, the prism body further includes a fourth prism 12*b*, a fifth prism 15*b*, and a sixth prism 17*b*. The fourth prism 12*b* and the fifth prism 15*b* are connected to each other through the UV glue, the fifth prism 15*b* and the sixth prism 17*b* are connected to each other through the UV glue, and the sixth prism 17*b* and the third prism 17*a* are connected to each other through the UV glue.

In an embodiment, the prism apparatus 300 further includes a first combining assembly 16*a* and a third combining assembly 16*b*. The first combining assembly 16*a* covers a seam between an upper surface of the first prism 12*a* and an upper surface of the second prism 15*a*, and covers a seam between the upper surface of the second prism 15*a* and an upper surface of the third prism 17*a*. The third combining assembly 16*b* covers a seam between an upper surface of the fourth prism 12*b* and an upper surface of the fifth prism 15*b*, and covers a seam between the upper surface of the fifth prism 15*b* and the upper surface of the sixth prism 17*b*.

Referring to FIG. 1 and FIG. 5, FIG. 1 is a structural diagram of the prism apparatus including one prism body, and FIG. 5 is a structural diagram of the prism apparatus including two prism bodies. In an embodiment, a surface of the second combining assembly 18 facing towards the prism body is provided with a first accommodating groove and a second accommodating groove respectively at positions corresponding to the first combining assembly 16*a* and the third combining assembly 16*b*. The first accommodating groove is configured to accommodate the first combining assembly 16*a*, and the second accommodating groove is configured to accommodate the third combining assembly 16*b*.

The prism apparatus 100 further includes a first light modulator and a second light modulator. The first light modulator 14*a* is provided close to the first prism 12*a*, and is configured to receive and modulate a light beam reflected by the first prism 12*a*, and to emit the modulated light beam to the third prism 17*a* through the second prism 15*a*. The second light modulator 14*b* is provided close to the fourth prism 12*b*, and is configured to receive and modulate a light beam reflected by the fourth prism 12*b*, and to emit the modulated light beam to the sixth prism 17*b* through the fifth prism 15*b*.

In an embodiment, the prism apparatus 100 further includes a light source 10, an opto-mechanical system 11, and a light splitting lens 13. The light source 10 is configured to provide an illumination beam. The opto-mechanical system 11 is configured to rectify a shape of the illumination beams emitted by the light source 10. The light splitting lens 13 is configured to split the rectified illumination beam emitted from the opto-mechanical system 11.

In this embodiment, the illumination beams emitted from the light source 10 passe through the opto-mechanical system 11 to form uniform illumination beams. The illumination beams enter the light splitting lens 13, and the illumination beams are split by the light splitting lens 13. The illumination light beams are divided into illumination light c1 and illumination light c2 by the light splitting lens 13. The illumination light c1 enters the first prism 12*a* and is reflected at an interface between the first prism 12*a* and the second prism 15*a*. The reflected illumination light c1 is incident on the first light modulator 14*a*. The first light modulator 14*a* modulates the illumination light c1 and then emits image light d1. The image light d1 passes through the first prism 12*a*, the second prism 15*a* and the third prism 17*a* in sequence, and then enters the sixth prism 17*b*. The illumination light c2 enters the fourth prism 12*b* and is reflected at an interface between the fourth prism 12*b* and the fifth prism 15*b*. The reflected illumination light c2 is incident on the second light modulator 14*b*. The second light modulator 14*b* modulates the illumination light c2 and emits image light d2. The image light d2 passes through the fourth prism 12*b*, the fifth prism 15*b* and the sixth prism 17*b* in sequence, and is directed towards a reflection surface of the sixth prism 17b. After the image light is reflected by the reflection surface of the sixth prism 17*b*, it is combined with the image light d1, and mixed into multicolored image light, which exits from the sixth prism 17*b*.

During assembly, first, the prism body is assembled. The first prism 12*a*, the second prism 15*a*, and the third prism 17*a* are assembled with the above-mentioned assembly method. The fourth prism 12*b*, the fifth prism 15*b*, and the sixth prism 17*b* are also assembled with the same method. After the first prism 12*a*, the second prism 15*a* and the third prism 17*a* are assembled, and the fourth prism 12*b*, the fifth prism 15*b* and the sixth prism 17*b* are assembled, the UV glue is coated on the reflection surface of the sixth prism 17*b* facing towards the third prism 17*a*, so as to bond the sixth prism to the third prism 17*a*. When the positions of the sixth prism 17*b* and the third prism 17*a* are relatively fixed, the assembly of the prism body is completed.

Second, the first combining assembly 16*a* and the third combining assembly 16*b* are assembled. The first combining assembly 16*a* is assembled on the upper surface of the first prism 12*a*, the upper surface of the second prism 15*a*, and the upper surface of the third prism 17*a* with the above method. Then, the third combining assembly 16*b* is assembled on the upper surface of the fourth prism 12*b*, the upper surface of the fifth prism 15*b*, and the upper surface of the sixth prism 17*b* with the above method. In this way, the assembly of the first combining assembly 16*a* and the third combining assembly 16*b* is completed.

Third, the second combining assembly is assembled. The second combining assembly inversely covers the prism body, such that the first combining assembly 16*a* is accommodated in the first accommodating cavity of the second combining assembly. After the third combining assembly 16*b* is accommodated in the second accommodating cavity of the second combining assembly, the surface of the first combining assembly 16*a* facing away from the prism body is in contact with the bottom surface of the first accommodating cavity, and the surface of the third combining assembly 16*b* facing away from the prism body is in contact with the bottom surface of the second accommodating cavity. When the surface of the first combining assembly 16*a* facing away from the prism body is completely bonded to the bottom surface of the first accommodating cavity, and the surface of the third combining assembly 16*b* facing away from the prism body is completely bonded to the bottom surface of the second accommodating cavity, the assembly of the second combining assembly is completed.

Finally, the first light modulator 14a is fixedly connected to a Kovar plate with a diaphragm. The Kovar plate with the diaphragm is fixed to the surface of the first prism 12a, such that the light refracted by the first prism 12a can enter the first light modulator 14a through the diaphragm. The second light modulator 14b is fixedly connected to a Kovar plate with a diaphragm. The Kovar plate with the diaphragm is fixed to the surface of the fourth prism 12b, such that the light refracted by the fourth prism 12b can enter the second light modulator 14b through the diaphragm. The first light modulator 14a and the surface of the first prism 12a can be fixed by the UV glue, and the second light modulator 14b and the surface of the fourth prism 12b can also be fixed by UV glue.

Figure 6:
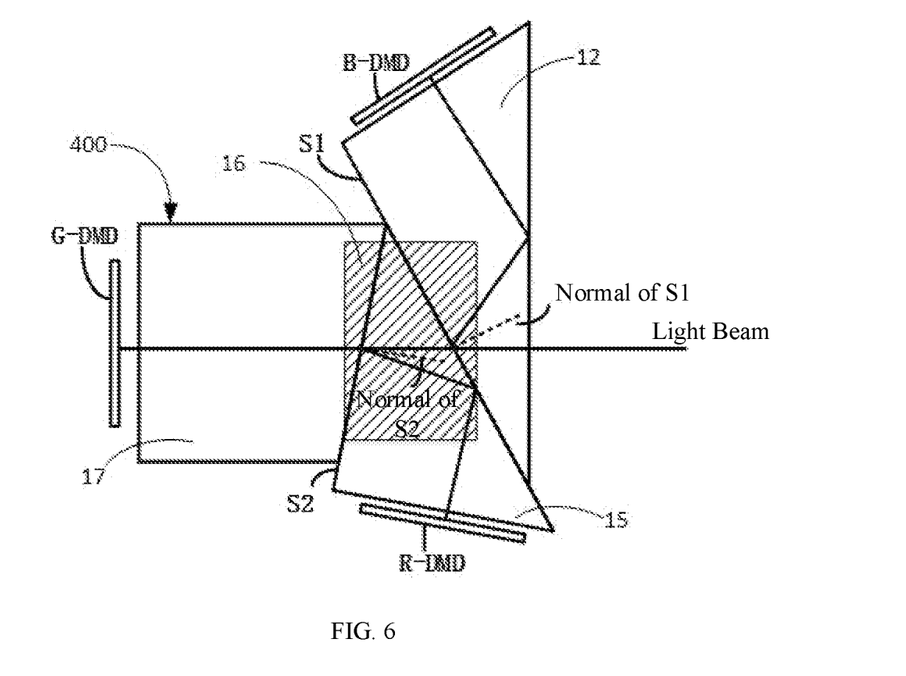
FIG. 6 is a top view of a prism apparatus according to a fifth embodiment of the present disclosure.

Referring to FIG. 6, FIG. 6 is a top view of a prism apparatus according to a fifth embodiment of the present disclosure, and FIG. 6 is a top view of the prism apparatus according to another embodiment of the present disclosure after the second combining assembly is removed.

As shown in FIG. 6, the structure of the prism apparatus 400 in an embodiment is similar to that of the prism apparatus 100 described in the above-mentioned embodiment, and the main difference therebetween is that the prism body of the prism apparatus 400 in this embodiment adopts a Philip prism structure. The prism body using the Philip prism structure includes a first prism 12, a second prism 15, and a third prism 17. The bonding surface between the first prism 12 and the second prism 15 is a surface S1, and the bonding surface between the second prism 15 and the third prism 17 is a surface S2. The surface S1 and the surface S2 are coated with a dichroic film. The first combining assembly 16 covers upper surfaces of all prisms of the Philip prism structure. The first combining assembly 16 also covers a seam between the upper surface of the first prism 12 and the upper surface of the second prism 15, and a seam between the upper surface of the second prism 15 and the upper surface of the third prism 17.

As shown in FIG. 6, when light beams are incident on the first prism 12 and the second prism 15, color separation and mixing are achieved. Due to the small incident angle of light beam on the surface S1 and the surface S2, the coating curve is sharp, the transition region is narrow, and the shift of the spectral line with the angle is small, so the light splitting and combining efficiency of the Philip prism structure is high. Since the incident angle of light on the surface S1 and the incident angle of light the surface S2 are smaller than a critical angle of the glass material, beam splitting can be achieved without bonding the prisms.

In other embodiments, the upper surface of the Philip prisms are further covered with a second combining assembly for rapid heat conduction and heat dissipation. A fan or air duct can also be provided on the metal plate corresponding to a non-irradiation region to assist heat dissipation. The configuration of the second combining assembly in the embodiment is similar to that of the second combining assembly 18 in the embodiments of the prism apparatus shown in FIG. 1 to FIG. 5, and will not be repeated herein.

The present disclosure further provides a projection device including a projection display screen. The projection device further includes a prism apparatus and a light source, and light emitted from the light source is projected onto the projection display screen through the prism apparatus.

The prism apparatus in the projection device of this embodiment can be the prism apparatus in any of the embodiments shown in FIG. 1 to FIG. 6. Details can be referred to the above description of FIG. 1 to FIG. 6, which will not repeated herein.

In the prism apparatus and projection device provided by the present disclosure, the prism apparatus is provided with the first combining assembly which is located at the seam of at least two adjacent prisms of the prism body and connected to the prisms, and the first combining assembly prevents a force generated by the second combining assembly after being heated from transferring to the prism body. A tensile force generated by the second combining assembly after being heated is blocked by the first combining assembly and is not directly applied on the prisms of the prism body, which prevents the second combining assembly from affecting the air gap of the prism body after the second combining assembly is expanded due to being heated, thereby improving the stability of the prism body.

The above described are embodiments of the present disclosure. It should be noted that, multiple improvements and modifications can be made by those of ordinary skill in the art without departing from the principle of the present disclosure, but these improvements and modifications should be considered within the protection scope of the present disclosure.

What is claimed is:

1. A prism apparatus, comprising:
a prism body, comprising prisms connected in sequence in a light guiding direction, wherein a gap is formed at a position where at least two adjacent ones of the prisms are connected to each other, and the prism body is integrally formed by the prisms;
a first combining assembly, arranged parallel to the light guiding direction, located at seams of the prisms, and connected to the prisms; and
a second combining assembly arranged parallel to the light guiding direction, and covering and connected to the first combining assembly.

2. The prism apparatus according to claim 1, wherein the second combining assembly is connected to the prism body.

3. The prism apparatus according to claim 1, wherein a surface of the second combining assembly facing towards the first combining assembly forms an accommodating cavity configured to accommodate the first combining assembly.

4. The prism apparatus according to claim 3, wherein when the first combining assembly is accommodated in the accommodating cavity, a surface of the first combining assembly facing away from the prism body is connected to a bottom surface of the accommodating cavity, and a surface of the first combining assembly facing towards the prism body is connected to the prisms of the prism body.

5. The prism apparatus according to claim 3, wherein when the first combining assembly is completely accommodated in the accommodating cavity, and a gap is formed between an inner surface of the accommodating cavity and the first combining assembly.

6. The prism apparatus according to claim 1, further comprising:
a heat dissipation mechanism provided on a surface of the second combining assembly facing away from the prism body.

7. The prism apparatus according to claim 6, wherein the heat dissipation mechanism is a heat dissipation fin provided on the second combining assembly or a heat dissipation air duct provided on a surface of the second combining assembly facing away from the prism body.

8. The prism apparatus according to claim 1, wherein at least two adjacent ones of the prisms of the prism body are glued together.

9. The prism apparatus according to claim 1, wherein the first combining assembly has a same thermal expansion coefficient as the prism body.

10. The prism apparatus according to claim 1, wherein the prisms comprise a first prism, a second prism, a third prism, a fourth prism, a fifth prism, and a sixth prism, wherein the first prism and the second prism are connected to each other through an UV glue, the second prism and the third prism are connected to each other through the UV glue, the fourth prism and the fifth prism are connected to each other through the UV glue, the fifth prism and the sixth prism are connected to each other through the UV glue, and the sixth prism and the third prism are connected to each other through the UV glue.

11. The prism apparatus according to claim 10, further comprising:
a third combining assembly, wherein the third combining assembly covers a seam between an upper surface of the fourth prism and an upper surface of the fifth prism, and covers a seam between the upper surface of the fifth prism and an upper surface of the sixth prism.

12. The prism apparatus according to claim 11, wherein a surface of the second combining assembly facing towards the prism body is provided with a first accommodating groove and a second accommodating groove respectively at positions corresponding to the first combining assembly and the third combining assembly, wherein the second accommodating groove is configured to accommodate the third combining assembly.

13. The prism apparatus according to claim 1, wherein the prism body of the prism apparatus adopts a Philip prism structure.

14. A projection device, comprising:
a projection display screen;
a prism apparatus, wherein the prism apparatus comprises a prism body, a first combining assembly, and a second combining assembly, wherein the prism body comprises prisms connected in sequence in a light guiding direction, wherein a gap is formed at a position where at least two adjacent ones of the prisms are connected to each other, and the prism body is integrally formed by the prisms; the first combining assembly is arranged parallel to the light guiding direction, located at seams of the prisms, and connected to the prisms; and the second combining assembly is arranged parallel to the light guiding direction and covers and is connected to the first combining assembly; and
a light source, p1 wherein light emitted from the light source is projected onto the projection display screen through the prism apparatus.

15. The projection device according to claim 14, wherein the prisms comprise a first prism, a second prism, a third prism, a fourth prism, a fifth prism, and a sixth prism, wherein the first prism and the second prism are connected to each other through an UV glue, the second prism and the third prism are connected to each other through the UV glue, the fourth prism and the fifth prism are connected to each other through the UV glue, the fifth prism and the sixth prism are connected to each other through the UV glue, and the sixth prism and the third prism are connected to each other through the UV glue.

16. The projection device according to claim 15, further comprising:
a third combining assembly, wherein the third combining assembly covers a seam between an upper surface of the fourth prism and an upper surface of the fifth prism, and covers a seam between the upper surface of the fifth prism and an upper surface of the sixth prism.

17. The projection device according to claim 14, wherein a surface of the second combining assembly facing towards the first combining assembly forms an accommodating cavity configured to accommodate the first combining assembly.

18. The projection device according to claim 17, wherein when the first combining assembly is accommodated in the accommodating cavity, a surface of the first combining assembly facing away from the prism body is connected to a bottom surface of the accommodating cavity, and a surface of the first combining assembly facing towards the prism body is connected to the prisms of the prism body.

19. The projection device according to claim 17, wherein when the first combining assembly is completely accommodated in the accommodating cavity, and a gap is formed between an inner surface of the accommodating cavity and the first combining assembly.

20. A prism apparatus, configured to guide light beams into a light modulator and receive a modulated image light, wherein a direction of the image light irradiating the prism apparatus is defined as a light guiding direction of a prism body;
the prism apparatus comprising:
the prism body, comprising prisms connected in sequence in a light guiding direction, wherein a gap is formed at a position where at least two adjacent ones of the prisms are connected to each other;
a first combining assembly, arranged parallel to the light guiding direction, located at seams of the prisms, and connected to the prisms; and
a second combining assembly arranged parallel to the light guiding direction, and covering and connected to the first combining assembly.

* * * * *